(12) United States Patent
Glessner et al.

(10) Patent No.: US 7,776,222 B2
(45) Date of Patent: Aug. 17, 2010

(54) DOCKSIDE WATER INTAKE SYSTEM FOR MARINE VESSELS

(76) Inventors: David Lee Glessner, 5920 Winsome La., Houston, TX (US) 77057; Michael Webster Sparks, 9134 Martin Heights Dr., Houston, TX (US) 77031

( * ) Notice: Subject to any disclaimer, the term of this patent is extended or adjusted under 35 U.S.C. 154(b) by 34 days.

(21) Appl. No.: 12/051,652

(22) Filed: Mar. 19, 2008

(65) Prior Publication Data

US 2008/0295758 A1 Dec. 4, 2008

Related U.S. Application Data

(60) Provisional application No. 60/896,733, filed on Mar. 23, 2007.

(51) Int. Cl.
*B01D 35/02* (2006.01)
(52) U.S. Cl. ............... 210/747; 210/170.11; 114/125; 137/236.1; 137/356; 405/127; 405/218
(58) Field of Classification Search ............. 210/747, 210/767, 170.01, 170.09, 170.11, 242.1; 114/74 R, 121, 125, 230.1; 441/4; 405/127, 405/218; 137/236.1, 234.6, 356, 899.2
See application file for complete search history.

(56) References Cited

U.S. PATENT DOCUMENTS

| 705,364 | A | | 7/1902 | Kurt | |
|---|---|---|---|---|---|
| 1,274,121 | A | | 7/1918 | White | |
| 3,037,636 | A | | 6/1962 | McFarlin | |
| 3,286,675 | A | * | 11/1966 | Weber | ............... 114/74 R |
| 3,664,388 | A | * | 5/1972 | Frankel | ............... 441/4 |
| 4,335,977 | A | * | 6/1982 | Ihli | ............... 405/127 |
| 4,623,452 | A | * | 11/1986 | Petersen | ............... 210/170.01 |
| 5,785,865 | A | * | 7/1998 | Salis | ............... 210/747 |
| 6,051,131 | A | | 4/2000 | Maxson | |
| 6,451,204 | B1 | | 9/2002 | Anderson | |
| 6,613,232 | B2 | | 9/2003 | Chesner et al. | |
| 6,660,170 | B2 | * | 12/2003 | Dreyer et al. | ............... 405/127 |
| 6,682,651 | B1 | | 1/2004 | Toland et al. | |
| 6,955,759 | B2 | | 10/2005 | Patrick et al. | |
| 7,081,205 | B2 | | 7/2006 | Gordon et al. | |
| 2004/0055966 | A1 | * | 3/2004 | Nguyen et al. | ............... 210/242.1 |
| 2005/0066868 | A1 | * | 3/2005 | Saho et al. | ............... 114/219 |
| 2007/0017549 | A1 | | 1/2007 | Ekholm et al. | |
| 2007/0056907 | A1 | | 3/2007 | Gordon | |
| 2009/0127207 | A1 | * | 5/2009 | Okamoto et al. | ............... 210/747 |
| 2009/0211507 | A1 | * | 8/2009 | Fielding et al. | ............... 114/125 |

OTHER PUBLICATIONS

International Search Report and Written Opinion of the International Searching Authority mailed Aug. 14, 2008 (PCT/US2008/057650; NSTAR/0003PCT).

* cited by examiner

*Primary Examiner*—Christopher Upton

(57) ABSTRACT

A method and apparatus for providing ballast water, cooling water, and/or auxiliary service water to a marine vessel is provided. The apparatus includes a plurality of pumps coupled to a docking facility. Each of the pumps collect water surrounding the docking facility and provides filtered water to the marine vessel as the vessel is moored. One or both of the docking facility and pumps may include a filtering device configured to prevent marine species from being entrained in the collected water.

21 Claims, 7 Drawing Sheets

DOCKSIDE WATER INTAKE SYSTEM FOR MARINE VESSELS

CROSS-REFERENCE TO RELATED APPLICATIONS

This application claims benefit of U.S. Provisional Patent Application Ser. No. 60/896,733, filed Mar. 23, 2007, which is incorporated by reference herein.

BACKGROUND

1. Field

The present invention generally relates to water supply systems for ballast water, cooling water, and auxiliary service water on marine vessels. More particularly, this invention relates to gathering or collecting water for water supply systems on marine vessels from a location away from the vessel to minimize environmental impact to an area where the marine vessel is operating.

2. Description of the Related Art

Marine vessels, such as cargo ships and cruise ships, have been used for years to transport cargo or people from port to port all over the world. The ports are typically located onshore near a body of water, and the ships are typically moored nearby to facilitate loading and unloading of the cargo or people. To provide for the operation of the vessel, there are provisions for the vessel to bring aboard water surrounding the vessel for the purposes of ballast, cooling, and other miscellaneous auxiliary services. Generally, water brought aboard a vessel falls into one of two categories, one being ballast water and the other being cooling or auxiliary service water.

Typically, the vessels are configured to displace a specific amount of water in order to maintain stability and/or provide maneuverability in the water, among other factors, and ballast water may facilitate this displacement. Ballast water may be water which is gathered and retained aboard the vessel until discharged at, or enroute to, a different location or port. To facilitate displacement of the vessel, the vessel typically includes one or more integral ballast tanks configured to receive and store the water, and to expel the water when desired. The water used to fill the ballast tanks is typically collected from the water around the vessel, and the ballast tanks may be filled or purged by an onboard system of pumps that is in communication with the ballast tanks on the vessel.

To provide for the operation of machinery and equipment on board the vessel, water is needed to perform a variety of duties. Cooling or auxiliary service water may be brought aboard for the purposes of cooling equipment or machinery, or performing some other required duty aboard the vessel, generally being discharged back into the surrounding water on completion of the duty. Typically, vessels will be provided propulsive and/or electrical power through diesel, steam, or gas turbine prime movers. In some cases, excess heat required to be removed from this equipment in the course of its operation is done through the transfer of heat to water that is taken from the surrounding area, put into the required service aboard the vessel, and thereupon returned by discharging the water back into the surrounding environment. In other cases, the water may be needed aboard the vessel to perform duties unrelated to power development. These activities may include providing sealing water for rotating equipment or other equipment, providing water for firefighting, supply water for reverse osmosis filtration or other types of distillation plants, and providing for sanitary water requirements, among other uses.

The water supplied for the purposes of use in ballast tanks, cooling water, and/or auxiliary services is typically collected by inlet conduits or intakes, sometimes referred to as sea chest openings, that are integral to the vessel hull and in communication with the ballast tanks or other systems for which the water is required. While these inlet conduits may include a grating or mesh to filter large debris during operation, the gratings typically do not exclude smaller debris and/or marine life, such as aquatic species of plants and animals. The introduction of certain marine life into the vessel's water intake system, for example fish species inadvertently pulled into the inlet conduit, may injure or kill the fish irrespective of the duty the water will perform aboard the vessel. Moreover, in the case of water brought aboard for ballast service, any marine biota, for example fish species and other organisms, surviving transfer into a ballast tank will be locationally displaced. This injury, unintentional eradication, or locational displacement of fish species may negatively impact the ecological balance in the body of water in which the vessel is docked, or the possibility of negative environmental impact to fish species may limit the docking or landing possibilities of the vessel. For example, estuaries, preserves, and other ecologically sensitive or protected marine areas may not be available as potential landing sites for the vessel. This limited docking potential may, in turn, prevent or minimize commercial ventures in certain areas, or may limit the availability of certain products in an area where the products may be used, thus forcing the products to be off-loaded at distant ports and transported to the area by alternate means.

As interest in ecologically sensitive areas grows, companies and other commercial interests desiring to create landing sites have become more cognizant of the fragile ecological balances in these areas. Some of these companies have made commitments to operating in these areas in a manner that not only maintains the ecological balance, but monitors and reacts to ecological shifts in these areas in an effort to enhance the ecosystem. Challenges exist for these companies as the typical vessel to be moored at the landing site may be an older vessel and/or is not equipped to limit impact to the area due to the age of the vessel, or the vessel is mechanically deficient of some apparatus that may limit environmental impact. For example, the companies that operate the landing sites often do not have a say in the age or manufacture of the vessel that is used to transport the cargo to the landing site. Thus, these companies have been challenged to make these vessels more ecologically friendly without major redesigns in the vessel itself.

Therefore, there is a need in the industry for a water intake filtering system that minimizes or eliminates intake of, and injury to, marine life and which also provides for retaining on board the vessel the water that is heated through cooling duty, both while maintaining an acceptable flow of water to support vessel requirements.

SUMMARY OF THE INVENTION

The invention generally provides a method for providing water to a marine vessel moored at a docking facility. The marine vessel may have one or more openings formed in a hull in communication with a water intake system. The method comprises disabling the one or more openings on the marine vessel to prevent inflow of water and providing one or more pumps coupled to a docking facility. The method may also comprise collecting water from the one or more pumps and transferring the collected water from the one or more pumps to the marine vessel for use in the water intake system.

In another embodiment, a method for providing filtered water to a water intake system on a marine vessel comprises mooring the marine vessel to a docking facility located in a body of water. The method may also comprise coupling a flexible conduit to the marine vessel in communication with at least two pumps located on the docking facility and transferring water collected from an area below the docking facility to the flexible conduit and to the water intake systems on the marine vessel.

In another embodiment, a pump station adjacent a docking facility in a body of water comprises a plurality of pump assemblies at least partially disposed in the body of water below the docking facility. Each of the pump assemblies may comprise an intake device coupled to a pump motor and a casing and a plurality of underwater lighting devices directed to a filter screen coupled to the intake device. The pump station may also comprise a controller and a plumbing system coupling each pump assembly together and adapted to couple to a marine vessel moored to the docking facility.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
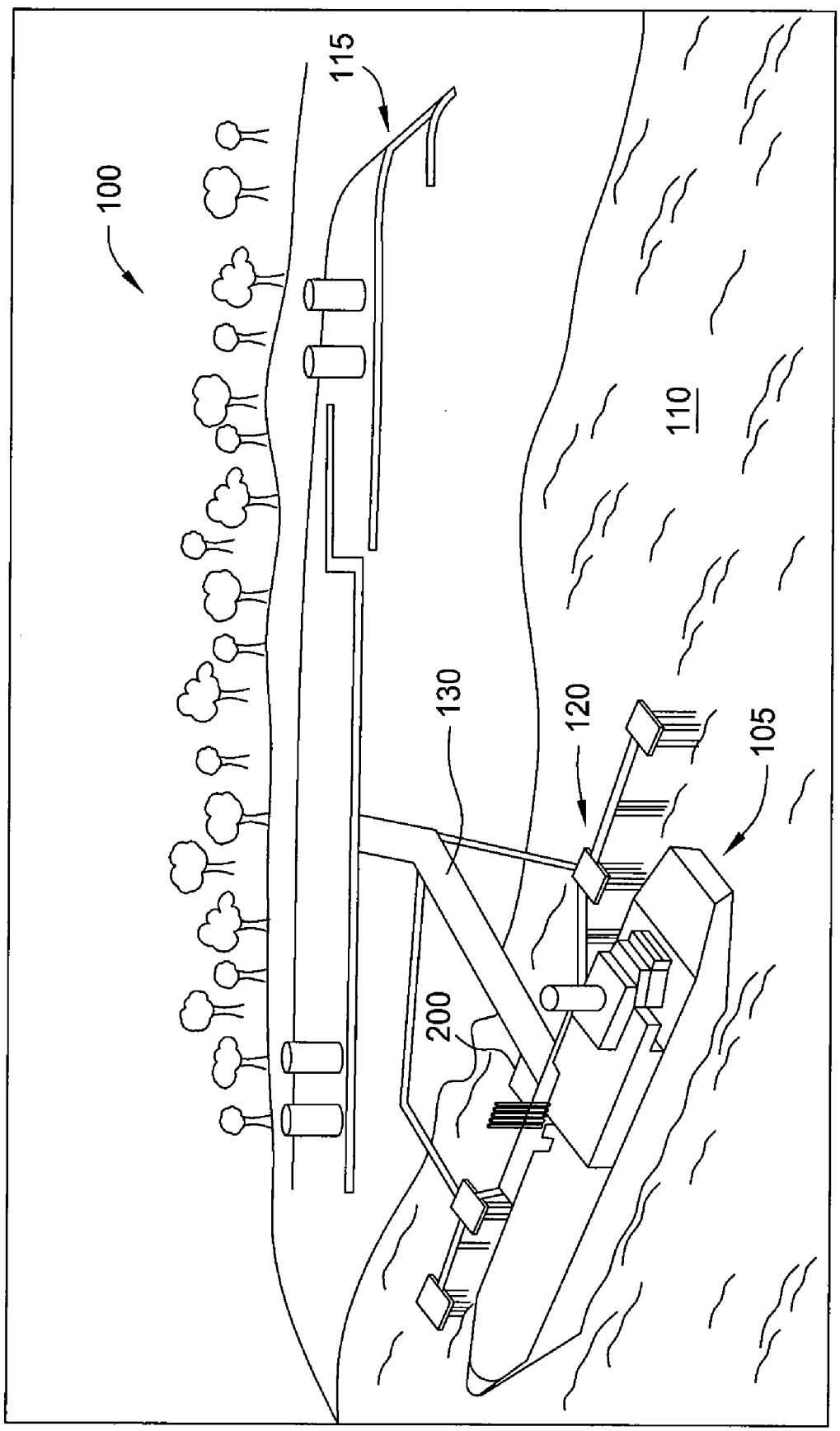
FIG. 1 is a perspective view of an exemplary landing site.

To facilitate understanding, identical reference numerals have been used, where possible, to designate identical elements that are common to the figures. It is also contemplated that elements and features of one embodiment may be beneficially incorporated on other embodiments without further recitation.

DETAILED DESCRIPTION

The present invention generally relates to water collection systems for filling water needs on marine vessels and may be exemplarily described for use on cargo ships, but embodiments described herein may be used on any vessel that requires water to perform required service or fulfill a need upon the vessel. Examples include cruise ships, submarines, personal watercraft, and any other marine vessel configured to gather, store, and expel ballast water, and/or gather, use, and discharge cooling and/or auxiliary service water. Although the invention is exemplarily described with respect to ballast, cooling, and auxiliary water systems aboard these vessels, embodiments described herein may also be adapted to filter incoming water used in other water intake systems aboard the vessels as well.

FIG. 1 is a perspective view of an exemplary landing site 100 having a vessel 105 in a body of water 110 adjacent a processing facility 115 located onshore. The vessel 105 is shown moored to a docking facility 120 that extends at least partially from the shore into the body of water 110. The body of water 110 may be any body of water suitable for a landing site for the vessel 105 and the docking facility 120 generally includes a pier structure 130 that may extend into the body of water to a length between several feet to a thousand or more feet from the shore. In this example, the processing facility 115 may be a liquefied natural gas (LNG) processing facility configured to process LNG off-loaded from the vessel 105.

The docking facility 120 provides a stable platform for loading and unloading cargo, such as LNG in this example. Conduits, such as pipes and hoses to facilitate loading and unloading of the LNG to and from the processing facility and the vessel 105 may be coupled to the docking facility 120 or in the body of water 110 between the vessel 105 and the processing facility 115. Other supplies, such as fuel, food, and other items used on the vessel 105, may be transferred to or from the vessel 105 by using the pier structure 130 or another portion of the docking facility 120.

The docking facility 120 also includes a pump station 200 that is positioned along the length of the pier structure 130. The pump station 200 generally includes one or more pumps (not shown in this Figure) in communication with the water underlying the docking facility and is configured to collect water surrounding the docking facility 120. The pumps may be coupled to power sources, such as motors or engines, and are adapted to collect the water for firefighting and water to be used on or in the vessel 105. Generally, the pump station 200 is configured to replace any water conventionally gathered by the openings in the hull of the vessel by providing the needed water from a location away from the vessel. The pumps and supporting equipment may be housed in a building integral to the pump station 200. While the pump station 200 is shown along the length of the pier structure 130, any portion of the docking facility 120 may be used for the pump station 200, depending on the depth of the water 110 around the docking facility 120.

Figure 2:
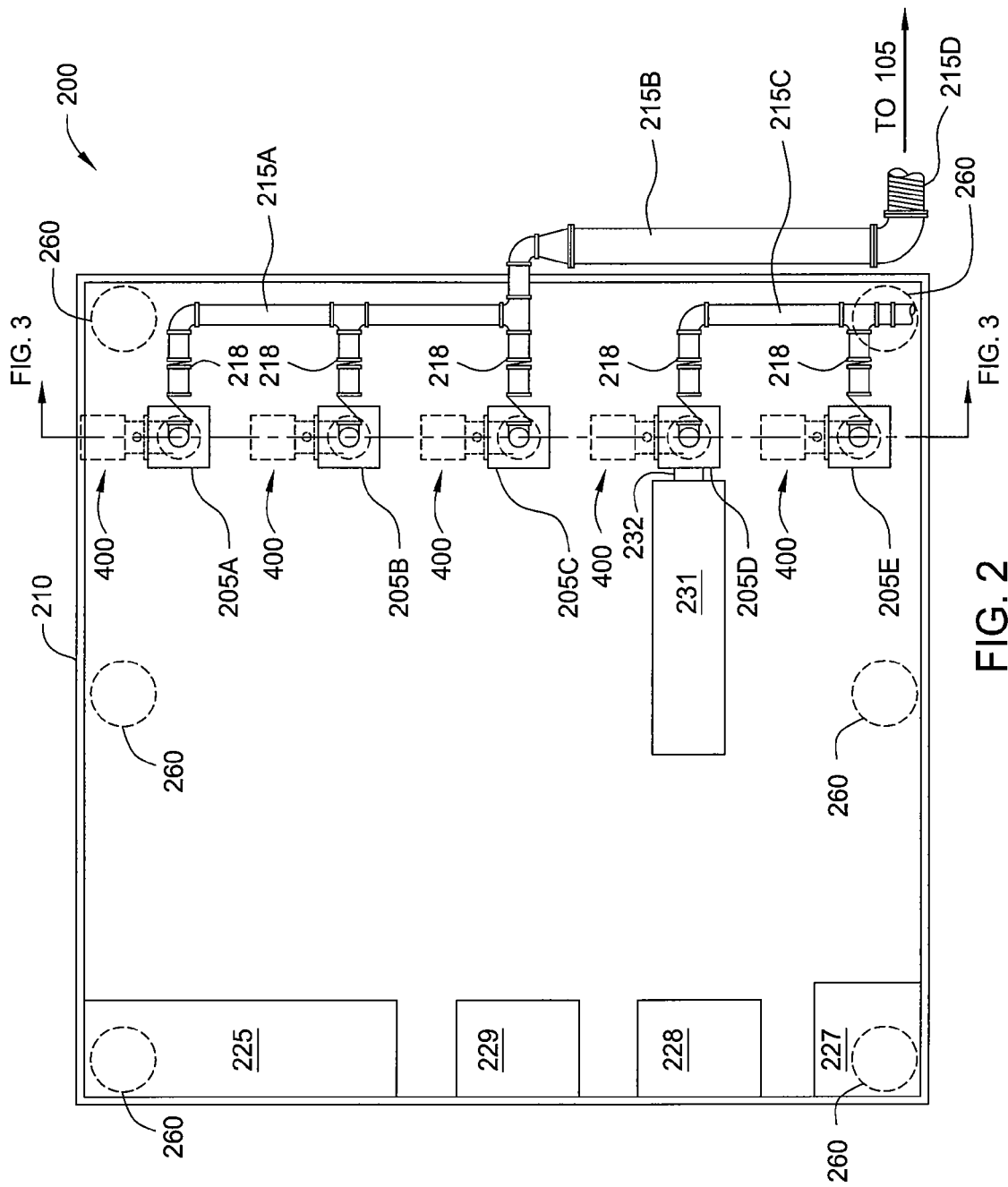
FIG. 2 is a top plan view of one embodiment of a pump station.

FIG. 2 is a top plan view of one embodiment of a pump station 200. The pump station 200 includes a plurality of pump assemblies 205A-205E coupled to a platform 210 that may be coupled with, or integral to, the pier structure 130 or another portion of the docking facility 120 of FIG. 1. The platform 210 may be supported by the pier structure 130 of FIG. 1 and may alternatively or additionally be supported by one or more pilings 260 (six are shown). The pilings 260 may be coupled to a perimeter of the platform 210 and the pump assemblies 205A-205E are generally positioned inside the perimeter between the pilings 260.

The pump station 200 is generally adapted to collect water surrounding the docking facility 120 of FIG. 1 and transfer the collected water to end uses on the docking facility 120 and the vessel 105. The pump station 200 is also configured to filter incoming water prior to transfer to the end use. Additionally, the pump station 200 is configured to minimize the velocity of the incoming water to each of the pump assemblies 205A-205E that are disposed in the surrounding water by providing a greater surface area for water collection. In one embodiment, the pump station 200 provides a water collection area that is spaced away from the pump assemblies 205A-205E, and this collection area includes a greater surface area than a conventional collection point integral to the pump assemblies 205A-205E, such as an inlet conduit coupled to each pump assembly.

Contrary to most conventional pumping applications, pump assemblies adapted to provide water to some end use device or object are typically pumps that are chosen based, at least in part, on the water supply needs of the device or object. For example, if a volume of about 5000 gallons per minute (gpm) is required to supply an end use, a pump assembly with a capacity of about 5500 gpm may be chosen. This decision may be based, at least in part, on economic factors, such as a cost factor wherein one 5500 gpm pump assembly may be less expensive to purchase, maintain, plumb, etc. relative to two or more pump assemblies with a collective capacity of at or about 5500 gpm. Thus, embodiments described herein may include high volume pump assemblies, but other embodiments may include adding additional, smaller volume pump assemblies, each of which may have a lower flow velocity relative to higher volume pump assemblies. The additional pump assemblies minimize the flow velocity of the incoming water in and around the pump station 200 and the collection area(s) while maintaining the required capacity, collectively, to the end use. Regardless of the capacity of the pump assemblies 205A-205E, a minimized flow velocity of the water to these pump assemblies may be accomplished in any manner, some of which are described below.

In one embodiment, a covering (shown in FIG. 3 as 320), such as a net, mesh, or screen, may be coupled to the pilings 260 or other portions of the platform 210 in a manner that surrounds or envelopes the pump assemblies 205A-205E therein, and filters marine life and debris at a location away from the pump assemblies. As the covering provides a greater surface area for incoming water, the flow velocity of the incoming water may be reduced in a collection area defined by an outer surface of the covering. In this manner, marine species and aquatic debris may be separated from the collection points of intake devices 400 coupled to the pump assemblies 205A-205E, and flow velocity at the covering may be significantly reduced. The covering thereby isolates marine species and/or debris from the intake devices 400 and minimizes or eliminates the impingement of marine life against the covering and the intake device. This, in turn, minimizes or eliminates unintentional injury or eradication of marine species by impingement at a collection point and/or entrainment in the collected water.

In another embodiment, the intake devices 400 are adapted to filter incoming water while reducing the flow velocity of the incoming water with or without the use of a covering coupled to portions of the platform 210. In one application, the intake device 400 comprises an interior volume for receiving and transferring water that is at least partially surrounded by a covering, such as a net, mesh, a sieve or other filtering device, that provides a greater surface area for incoming water. In one embodiment, the intake device includes a filter screen comprising a plurality of filtering members configured to filter incoming water and increase the surface area for incoming water, which will be described in detail in reference to FIG. 4.

Each of the plurality of pump assemblies 205A-205E are coupled to a plumbing system, such as conduits 215A-215C that are configured to transfer water gathered by the pump assemblies 205A-205E to various end uses, such as water intake systems located on the vessel and fire fighting applications. In one example, the pump assemblies 205A-205C may be configured to collect water for water intake systems used aboard the vessel, while the pump assemblies 205D-205E may be configured to collect water for use in a fire fighting application.

The water collected by the pump assemblies 205A-205C may be transferred to the vessel by various plumbing components coupled to the pump assemblies. In this example, three pump assemblies 205A-205C are coupled to a manifold conduit 215A, which is coupled to a high volume conduit 215B that transfers the collected water to the vessel for use in water intake systems aboard the vessel. The high volume conduit 215B may be coupled to a conduit 215D adapted to transfer collected water from the pump assemblies 205A-205C. The conduit 215D may be any tubular member adapted to succumb to slight pitching and rolling that may be encountered by the vessel as it is moored. In one embodiment, the conduit 215D may be a hose, a tubular member having one or more flexible portions, a loading arm adapted to flex, or other conduit that is adapted to couple to the vessel while the vessel is moored. In another embodiment, the conduit 215D may be substantially rigidly connected to the docking facility 120. While a single conduit 215D is shown coupled to three pump assemblies 205A-205C, any number of pump assemblies may be used. Additionally, any number of conduits 215D may be provided as an output from the pump station 200. Additional pump assemblies (not shown) may be coupled to additional conduits (such as 215A, 215B and/or 215D) and may be operated as a separate system or in tandem with the system shown. In one application, two or more pump stations 200 may be operated to provide water to the vessel 105.

For example, the vessel may include one or more standpipes (shown in FIGS. 6-8) that are integral to a portion of the vessel deck or hull. The one or more standpipes are in communication with the various water intake plumbing systems aboard the vessel. For example, the one or more standpipes integral to or retrofitted onto the vessel may be plumbed to provide collected water for cooling systems, auxiliary water systems, and/or ballast tanks and systems within or on the vessel. In one application, the one or more standpipes are plumbed to cooling systems and the collected water is used as a heat exchange medium for machinery and other devices or objects within or on the vessel. In this manner, at least a portion of the vessel water needs are provided by the pump station 200 without the use of conventional water collection devices integral to the vessel, such as openings in the hull of the vessel, sometimes referred to as sea chests. The water may then be cycled or provided to ballast or other systems aboard the vessel in a manner that allows cooling of the heated water. This water may be stored in the ballast tanks, or cycled by onboard pumps to the water surrounding the vessel, or provided to other systems within or on the vessel. In this manner, at least a portion of the vessel water needs are provided by the pump station 200 without the use of conventional water collection devices integral to the vessel, such as sea chests, while eliminating or reducing any heat pollution in the water surrounding the vessel.

In one operational example, the vessel may be moored to the docking facility 120, and the openings in the hull configured for water intake may be disabled to prevent the intake of surrounding water. Although the intake of surrounding water may be disabled at the openings in the hull, the water for on-vessel water intake systems that would be supplied by the openings in the hull may be rerouted to be supplied from one or more standpipes on the vessel. The water needs of the vessel may be provided from the pump station 200, through the one or more standpipes, and cycled on board. Once the water has served the intended purpose, the water may be either stored in ballast tanks aboard the vessel, or returned to the water surrounding the vessel.

Although three pump assemblies 205A-205C configured to serve the water intake needs of the vessel are shown in FIG. 2, any number of pump assemblies may be used depending on factors, such as water volume needs of the vessel and pump capacity, and water availability below the platform 210, among other factors. Also, valves 218 may be coupled between the manifold conduit 215A and the pump assemblies to control water flow to the manifold such that one, two, or all three of the pump assemblies 205A-205C may be used. The valves 218 may include a bypass capability to return water when the water is not needed. Alternatively, the pump assemblies 205A-205C may be cycled on and off, as needed, to supply the water needs of the vessel.

The pump station 200 also includes a control panel 225 for controlling the pump assemblies 205A-205E. Power to the pump assemblies 205A-205E may be provided from an onshore power source that is in communication with the control panel 225. An auxiliary power source 228, such as an engine driven generator, may be coupled to the pump assemblies 205A-205E through the control panel 225 to provide auxiliary or emergency power as needed. A dedicated auxiliary engine 231, which is shown coupled to pump assembly 205D by a gearbox 232, may be used in the event that electrical power is not available. Although not shown, other auxiliary engines may be coupled to other pump assemblies as well. Other supporting equipment, such as a day tank 227 for storing fuel used in one or both of the power source 228 and the engine 231 may be coupled to the platform 210. An air compressor 229 may also be provided on the platform 210 to support other equipment, such as providing compressed air to the intake device 400 of the pump assemblies 205A-205E.

Figure 3:
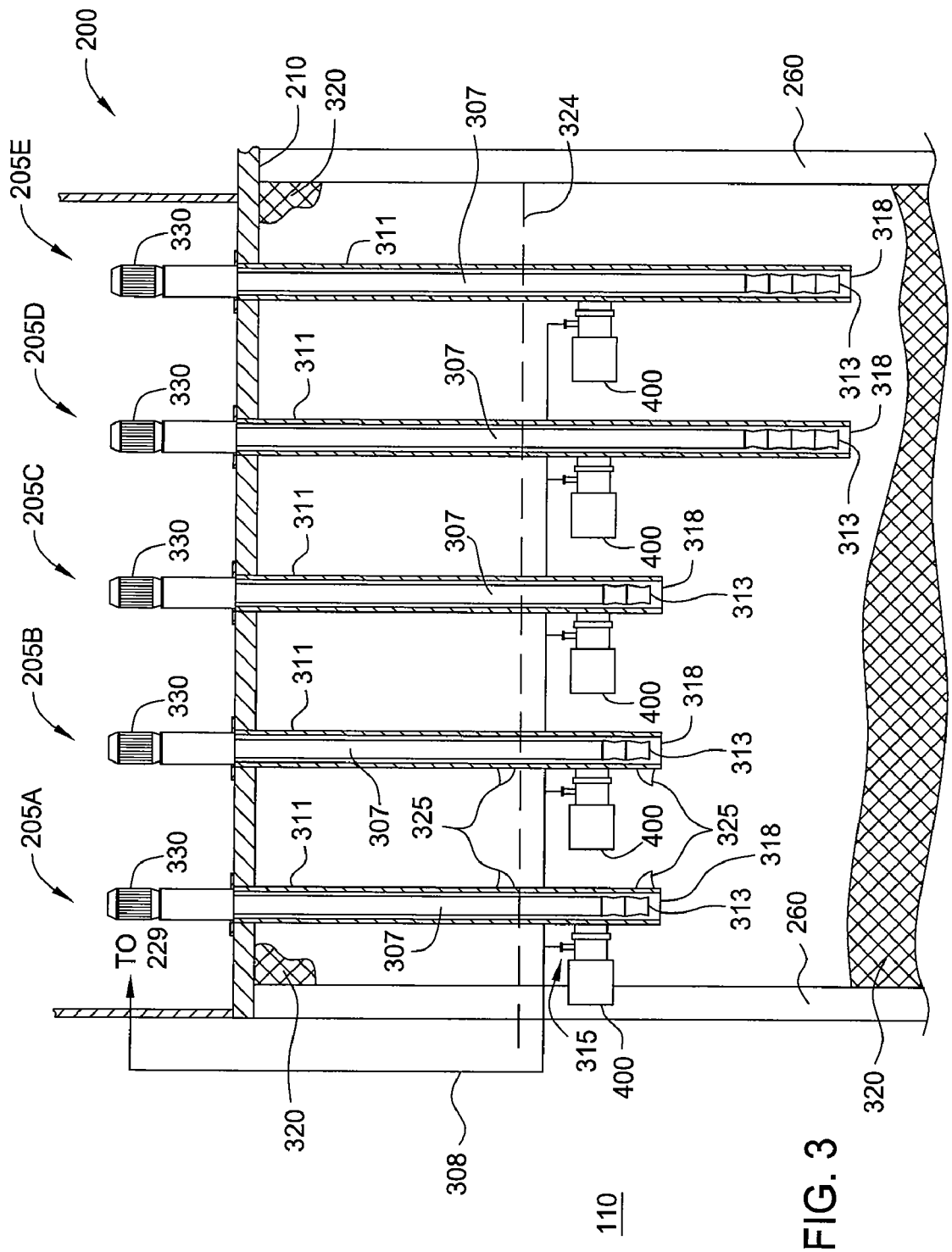
FIG. 3 is a side plan view of the pump station shown in FIG. 2.

FIG. 3 is a side plan view of the pump station 200 shown in FIG. 2. The pump assemblies 205A-205E are shown disposed through openings in the platform 210. A portion of a covering 320 coupled to the pilings 260 is also shown but has been cutaway to show details of the underside of the pump station 200. Each pump assembly 205A-205E includes a pump motor 330 having an impeller in communication with an intake tube 307. Each intake tube 307 is disposed in a casing 311 having a length for a desired head pressure at each pump assembly. Each casing 311 is coupled to an intake device 400 that is positioned in the water 110 to a sufficient depth. Water surrounding the intake device 400 enters the intake device and travels in an annulus between the casing 311 and the intake tube 307 to a lower portion of the casing 311, which is sealed by a cap 318. The water then passes through an inlet 313 in a lower portion of the intake tube 307 and the water is moved through the pump assembly to the manifold conduit 215A for transfer to the vessel, or a manifold conduit 215C for use in firefighting applications, in one example.

One or more of the pump assemblies 205A-205E may include a plurality of lighting devices 325 adapted to direct light toward each intake device 400, which are adapted to repel at least a portion of marine life from the vicinity of the intake device 400. The lighting devices 325 may be coupled to a portion of the pump station 200, such as on a piling 260 and/or to the casing 311 adjacent each intake device 400 as exemplarily shown on pump assembly 205B. In one application, the lighting devices 325 may be coupled to the casing 311 and adapted to direct light to a neighboring or adjacent intake device 400 as shown on the casing 311 of pump assembly 205A. In another application, the lighting devices 325 may be coupled to the casing 311 integral to the pump assembly and are adapted to direct light to the intake device 400 coupled thereto, as shown on the casing 311 coupled to pump assembly 205B. In another application, lighting devices 325 may be located on both adjacent and integral casings 311, and/or other portions of the pump station 200, such as on a piling 260 (not shown).

The depth of the intake devices 400 may be different for different locations and are configured to allow a sufficient water volume to be available to the intake device coupled thereto. For example, the depth determination may include factors such as depth of the water, cleanliness of the water, tidal fluctuations, and the like. The depth determination may also include a depth determined by an extreme low water level 324, which may be determined by historical water level records, historical rainfall records and/or forecasts, tidal ranges, seasonal water level fluctuations, for example snowmelt fluctuations, and the like. In one embodiment, each intake device 400 is positioned in the water 110 at about six feet below the extreme low water level 324, although other depths may be used.

Each intake device 400 may include a filter screen 322 (shown in FIG. 4) that may be a mesh, a net, a sieve, a plurality of filtering members, or any covering adapted to filter debris and marine life before water enters the intake device 400. The filter screen 322 is configured to at least partially surround an interior volume of the intake device 400 and the available surface area for water collection. A backwash system 315 may also be integral to each intake device 400. The backwash system 315 is adapted to clear the filter screen 322 of waterborne debris and any marine life that has impinged upon the outer surface of the filter screen 322 on an as-needed basis. The backwash system 315 may be adapted to monitor the incoming water pressure and may automatically actuate the backwash system to restore acceptable flow. As an example, the backwash system 315 may be coupled to a source of compressed gas, such as the air compressor 229 of FIG. 2, by a conduit 308, and a burst of compressed gas may be provided to the interior volume of the intake device 400 in order to restore acceptable flow to the intake device 400.

Figure 4:
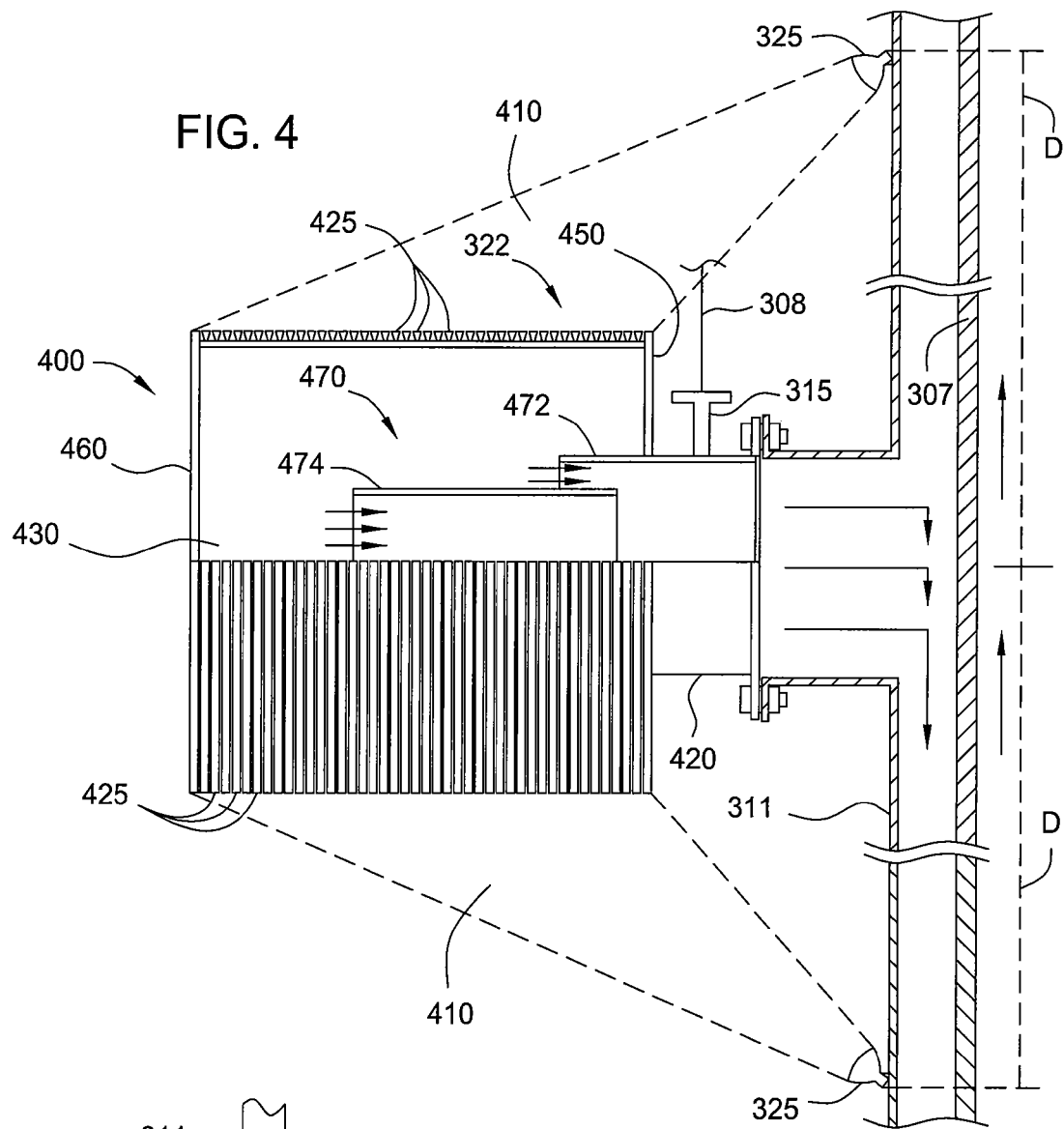
FIG. 4 is a side view of an intake device that has been partially cut-away.

FIG. 4 is a side view of an intake device 400 that has been partially cut-away to show a portion of an interior volume 430. The intake device 400 includes an outlet pipe portion 420 adapted to couple to a casing 311 to transfer collected water to the intake tube 307. The intake device 400 includes a filter screen 322 attached to the outlet pipe portion 420 by end cap 450. The filter screen 322 includes a plurality of filtering members 425 having openings therebetween that are configured to filter marine life and debris as water enters the interior volume 430. The intake device 400 also includes an end cap 460 that forms one end of the interior volume 430.

The intake device 400 also includes a flow modification device 470 disposed in the interior volume 430 that is adapted to minimize the flow velocity gradient across the face of the filter screen 322 alone or in conjunction with the increased surface area of the filter screen 322. For example, the intake device 400 is configured to facilitate an approach velocity, which may be defined as the incoming water velocity perpendicular to and approximately three inches in front of the outer surface of the filter screen 322. In one application, the approach velocity is between about 0.1 feet per second (fps) and about 1.0 fps. In one specific application, the intake device 400 may be configured to have an approach velocity of about 0.2 fps or less. To facilitate the enhanced approach velocity, the flow modification device 470 comprises a first inlet 472 and a second inlet 474. In one embodiment, the flow rate of the incoming water through the first inlet 472 is substantially equal to the flow rate of the incoming water through the second inlet 474, thus substantially equalizing the flow velocity gradient across the face of the filter screen 322. In one example, the intake device 400 may be an intake screen available from Johnson Screens of Minneapolis, Minn.

In one application, each casing 311 may be equipped with a plurality of lighting devices 325 positioned in the vicinity of each intake device 400. In one embodiment, each of the plurality of lighting devices 325 may be a strobe light configured to flash intermittently or synchronously. The lighting devices 325 may be powered by a battery or other power supply (not shown) coupled to the casing 311, disposed on the platform 210, or integral to the lighting devices 325. In some applications, the lighting devices 325 may be powered by a power source coupled to the control panel 225 (FIG. 2) using cords or wires in communication with the lighting devices 325. The plurality of lighting devices 325 are directed outwardly toward the intake device 400 to provide a lighted zone or pattern 410 that impinges the filter screen 322. In one embodiment, one or a combination of the lighting devices 325 are adapted to provide an irradiance of about 90 W/meter$^2$ at a distance of about 1.5 meters from the outer surface of the filter screen 322. In one application, the plurality of lighting devices 325 are strobe lights adapted to flash in a synchronous mode and in one specific application, the strobe lights are adapted to flash synchronously at a rate of about 250 to about 350 flashes per minute.

Each of the lighting devices 325 may be coupled directly to the casing 311 or may be coupled to a frame or extensions (not shown in this Figure) joined to the casing or other portions of the platform 210. Each lighting device 325 may be angled from the longitudinal axis of the casing 311 at an angle between about 30° to about 60°, such as about 45°. In one specific application, each of the lighting devices 325 may be mounted a distance D from a centerline of the intake device 400, and the distance D is based on a diameter of the filter screen 322 of the intake device 400. In one application, the distance D of each lighting device 325 may be equal to a diameter of the filter screen 322. In one example, the distance D of the lighting devices 325 may be about three feet from a centerline of the intake device 400 based on a filter screen 322 having a three foot diameter. Other distances D may be used, such as a distance D that is one half the diameter of the filter screen 322.

Figure 5:
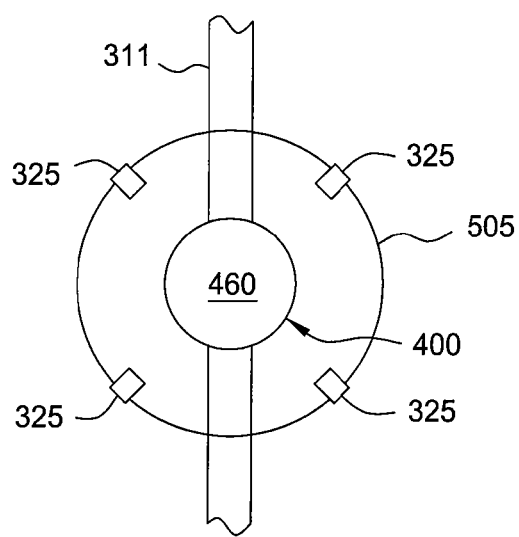
FIG. 5 is a front view of an intake device coupled to a casing.

FIG. 5 is a front view of an intake device 400 coupled to a casing 311 having a plurality of lighting devices 325 coupled to the casing 311 by a frame 505. In one application, the plurality of lighting devices 325 are configured to provide light to the entire intake device 400 to repel marine species from the intake area surrounding the intake device 400. In one embodiment, four, five, or six lighting devices 325 may be coupled to the frame 505 to provide light to the intake device 400 although any number of lighting devices 325 may be used. The lighting devices may be configured in a circular arrangement around the intake device 400 and spaced at substantially equal angles relative to each other. In one application, the lighting devices are spaced between about 30° to about 100° relative to another lighting device 325. In some applications, where six lighting devices 325 are used, the lighting devices may be spaced at about 60° intervals. In other applications where four lighting devices 325 are used as shown, the lighting devices may be spaced at about 90° intervals.

Figure 6:
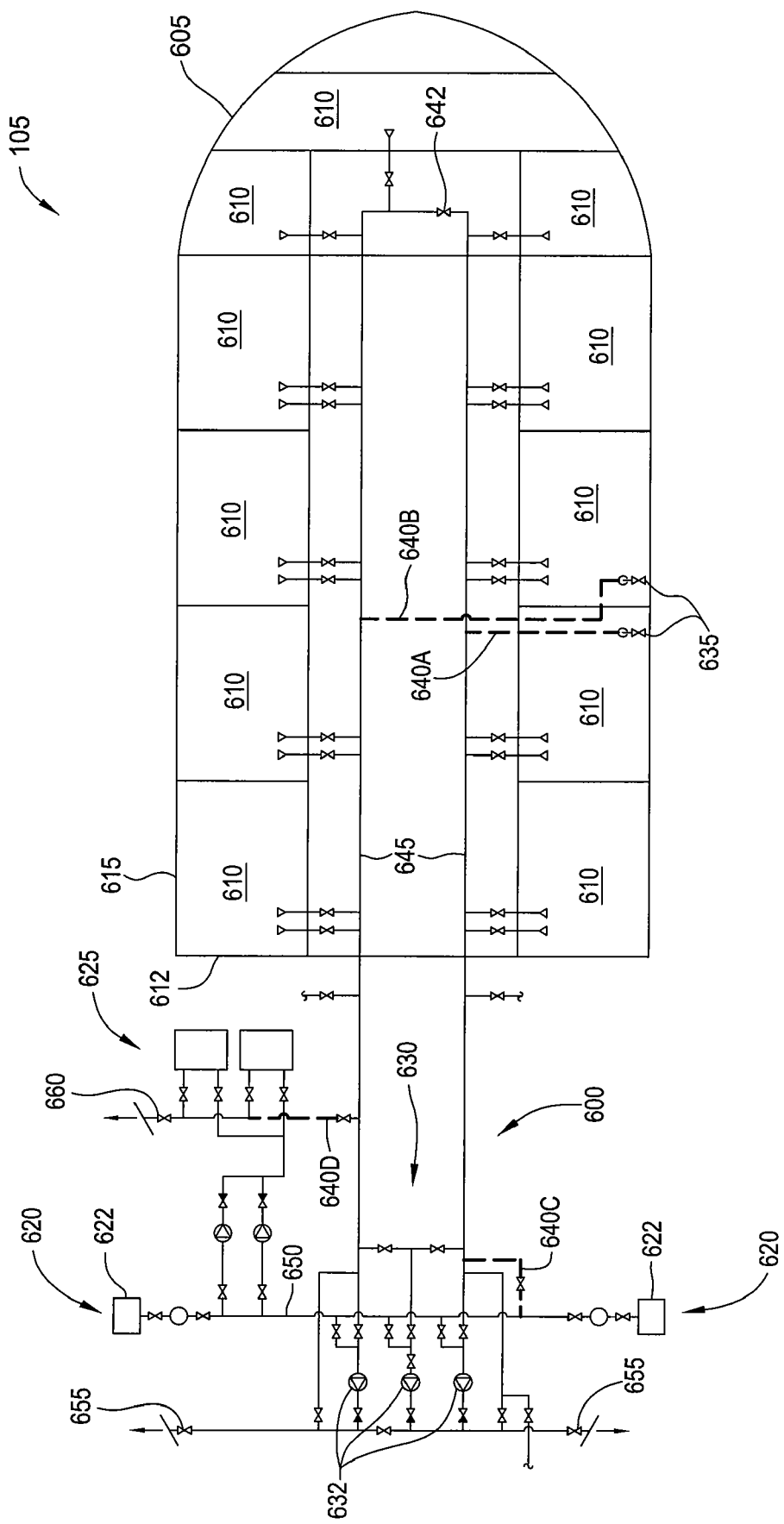
FIG. 6 is a schematic view of one embodiment of a water management system that may be configured for a vessel equipped with steam turbine, diesel, or diesel-electric propulsion.

FIG. 6 is a schematic view of one embodiment of a water management system 600 that may be configured for a vessel 105 equipped with steam turbine, diesel, or diesel-electric propulsion. As shown in this Figure, the vessel 105 includes a portion of a hull 615 having a bow portion 605. A plurality of ballast tanks 610, for temporary storage of water, are shown disposed in the hull 615. Other ballast tanks may be disposed aft of an engine room bulkhead 612 but are not shown for clarity. Each of the plurality of ballast tanks 610 are in communication with a water intake system 620, which typically includes one or more openings 622 formed in the hull, and a ballast pump system 630. The one or more openings 622 disposed in the hull may be referred to as sea chests. The ballast pump system 630 typically includes one or more pumps 632 to transfer water to or from the plurality of ballast tanks 610 through various conduits, valves, and strainers. The water intake system 620 may also include a freshwater cooling system 625 that cycles freshwater in a closed-loop aboard the vessel 105.

In coupling to the pump station 200, the pumps 632 may be deactivated and one or more standpipes 635, disposed in or on the hull 615 of the vessel 105, are coupled to the water management system 600 by additional conduits 640A-D. Each of the standpipes 635 may be flexible conduits or may be configured as loading arms. Water from the pump station 200, coupled to one or both of the standpipes 635 through conduit 215D (FIG. 2) is provided to the ballast tanks 610 on an as-needed basis. Water levels in each of the ballast tanks 610 may be equalized by opening valve 642 disposed in a ballast main 645. The water is provided to ballast main 645 and the water may be in communication with a seawater crossover 650 by additional conduit 640C. The freshwater cooling system 625 may also be in communication with ballast main 645 by additional conduit 640D. In one embodiment, cooling water for the freshwater cooling system 625 is taken from the port side of the vessel 105 and returned to the starboard side of the vessel 105. Valves that are normally open when the ballast pump system 630 is used are closed, such as a portion of the valves associated with the ballast pump system 630 and valves coupled to the openings 622. Valves 655, configured to return ballast water overboard when open, may also be closed. Valve 660, configured to expel cooling water overboard when open, may also be closed.

Figure 7:
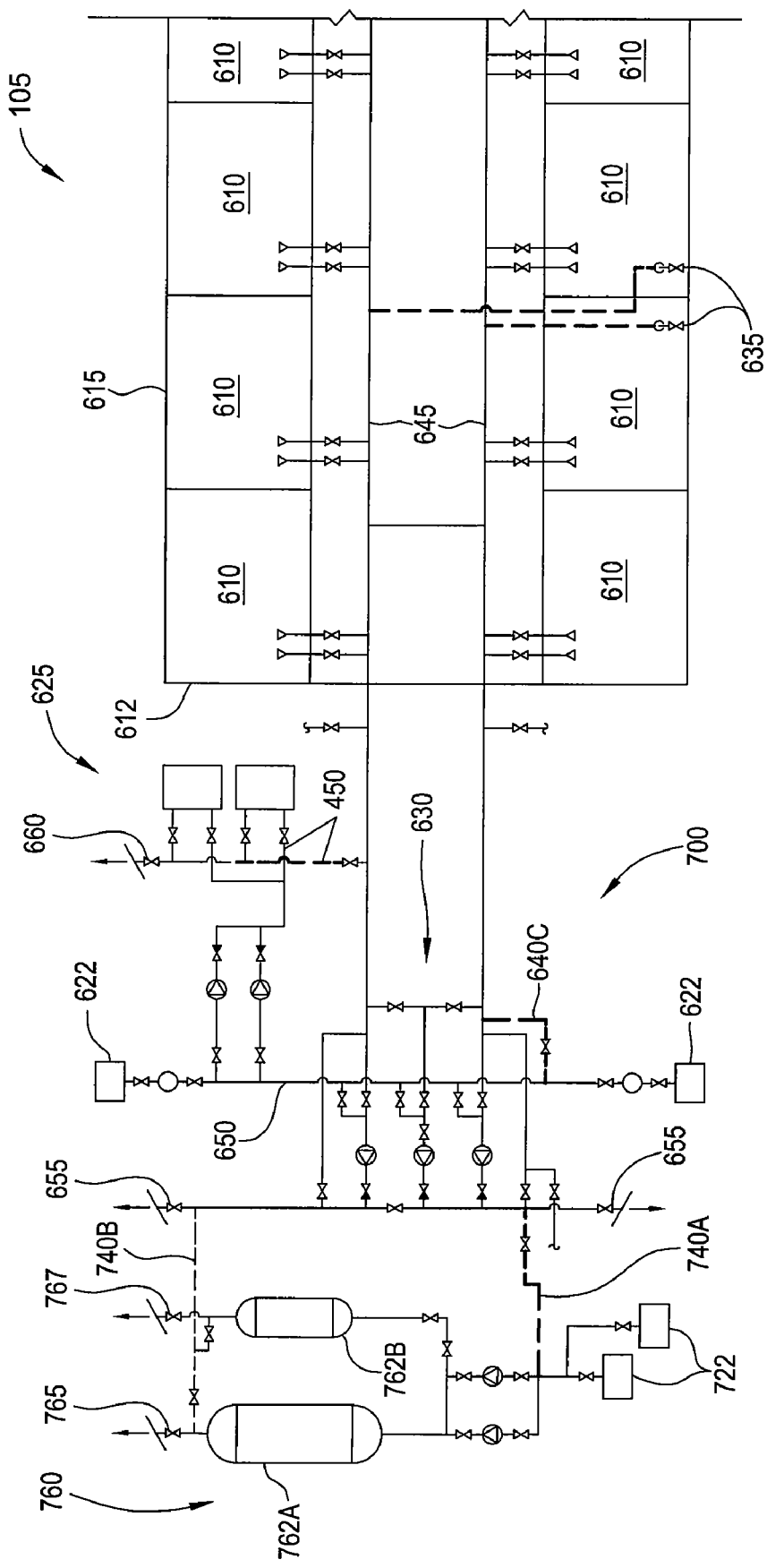
FIG. 7 is a schematic view of one embodiment of a water management system that may be configured for a vessel equipped with steam turbine propulsion without scoop injection.

FIG. 7 is a schematic view of one embodiment of a water management system 700 that may be configured for a vessel 105 equipped with steam turbine propulsion without scoop injection. Reference numerals that are similar to elements shown in FIG. 6 are labeled accordingly but the vessel 105 shown in this Figure has additional features, such as a condenser system 760 having one or more condensers 762A, 762B. The condenser system 760 may be coupled to one or more ballast tanks 722 located at or near the stern of the vessel 105. Coupling the water management system 700 to the pump station 200 as described above in reference to the water management system 600 of FIG. 6 may be substantially similar. Added are additional conduits 740A, 740B coupling the condenser system 760 to the water management system 700 and ballast tanks 610. Valves coupling the ballast tanks 722 to the condenser system 760 may be closed and associated pumps may be deactivated when coupled to the pump station 200. Also, valves 765 and 767, which may be configured to expel condenser water overboard, may also be closed.

Figure 8:
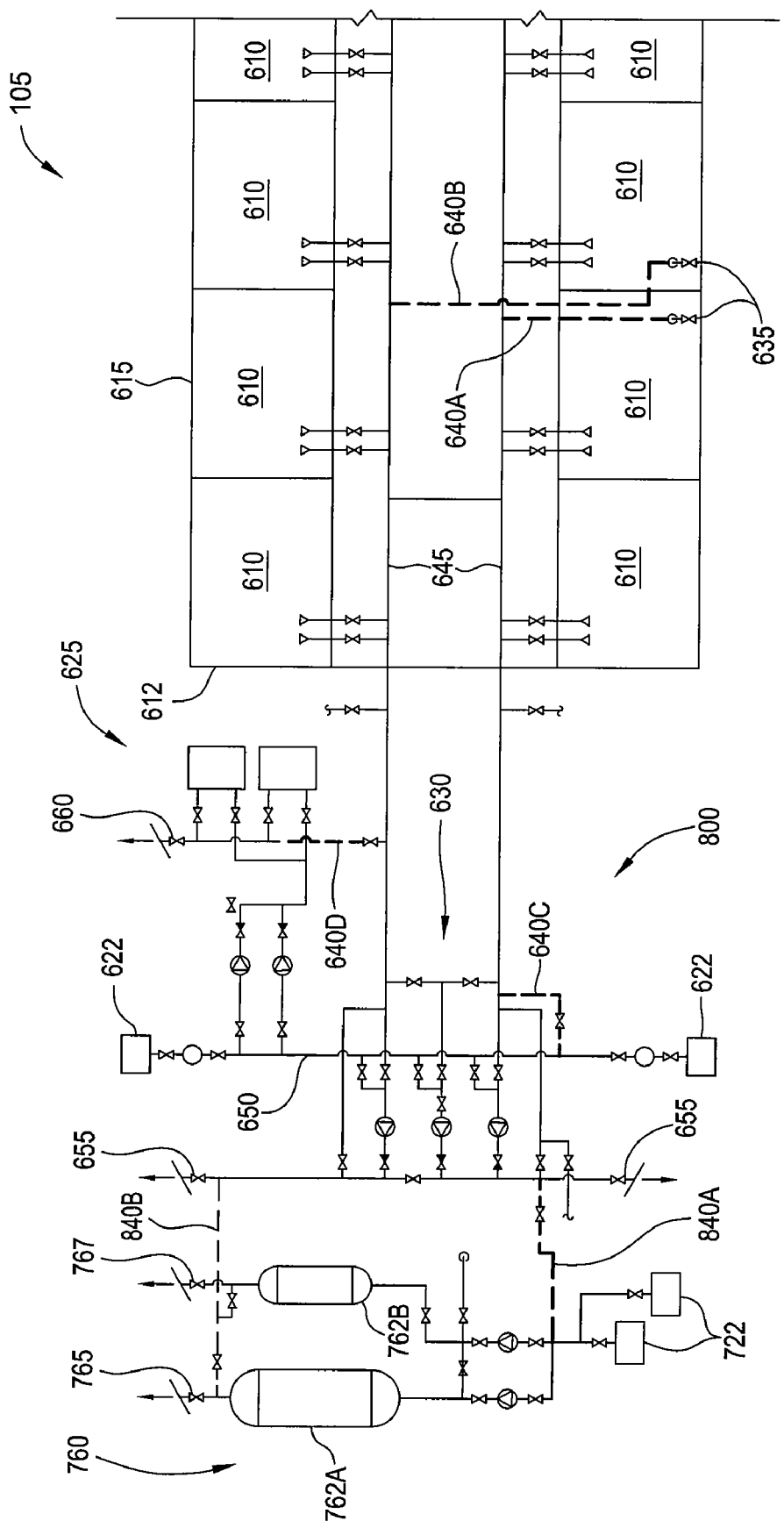
FIG. 8 is a schematic view of one embodiment of a water management system 800.

FIG. 8 is a schematic view of one embodiment of a water management system 800 that may be configured for a vessel 105 equipped with steam turbine propulsion with scoop injection. Reference numerals that are similar to elements shown in FIGS. 6 and 7 are labeled accordingly. The condenser system 760 may be coupled to one or more ballast tanks 722 located at or near the stern of the vessel 105. Coupling the water management system 800 to the pump station 200 as described above in reference to the water management system 700 of FIG. 7 may be substantially similar. Added are additional conduits 840A, 840B coupling the condenser system 760 to the water management system 800 and ballast tanks 610. Valves coupling the ballast tanks 722 to the condenser system 760 may be closed and associated pumps may be deactivated when coupled to the pump station 200. Also, valves 765 and 767, which may be configured to expel condenser water overboard, may also be closed.

The pump station 200 as described herein is configured to supply all or a great portion of the water intake requirements of the vessel moored nearby, while eliminating or minimizing the need for onboard water intake systems to be used as the vessel is moored. In one application, the water supply requirements of the vessel may peak between about 5000 gpm to about 16,000 gpm, and the one or more pump assemblies 205A-205C, as described herein, is configured to provide this required flow rate. In another application, the water supply requirements of the vessel may peak between about 3000 gpm to about 5,000 gpm, and the one or more pump assemblies 205A-205C, as described herein, is configured to provide this required flow rate. While the required flow rate may be supplied by one or more of the pump assemblies 205A-205C, the approach velocity at each intake device and/or at the collection area provided by the covering is lessened. In one embodiment, this peak flow rate to the vessel may be supplied with an approach velocity between about 0.1 fps to about 1.0 fps at each intake device 400.

Embodiments described herein are adapted to minimize the ecological footprint of a marine vessel operating in a body of water. The pump station as described herein provides for the water intake needs of a marine vessel while minimizing or eliminating the unintentional injury, eradication, and/or relocation of marine species. In this manner, marine life populations in the body of water will not be significantly reduced or affected in the area around the docking facility. The apparatus and method as described herein allows minimal environmental impact in an area that may be protected and may open up the possibilities for landing sites for commercial ventures.

While the foregoing is directed to embodiments of the present invention, other and further embodiments of the invention may be devised without departing from the basic scope thereof, and the scope thereof is determined by the claims that follow.

The invention claimed is:

1. A method for providing water to a marine vessel moored at a docking facility, the marine vessel having one or more openings formed in a hull in communication with a water intake system on the vessel, the method comprising:
   disabling the one or more openings on the marine vessel to prevent inflow of water;
   providing one or more pumps having an inlet submersed in a body of water surrounding the vessel moored to the docking facility;
   collecting water from the body of water with the one or more pumps; and
   transferring the water from the one or more pumps to the marine vessel for use in the water intake system.

2. The method of claim 1, further comprising:
   filtering the water before the water is collected.

3. The method of claim 2, further comprising:
   routing the filtered water to a cooling system on the marine vessel.

4. The method of claim 3, further comprising:
   routing heated water from the cooling system to one or more ballast tanks on the vessel.

5. The method of claim 4, further comprising:
   discharging the water from the ballast tanks on the vessel to the body of water.

6. The method of claim 1, wherein the collecting water step further comprises:
   filtering the water at an intake device coupled to each pump.

7. The method of claim 6, wherein the intake device is configured to exclude marine species.

8. The method of claim 6, wherein the collecting water further comprises:
   providing intermittent flashes of light to the intake device.

9. A method for providing filtered water to a water intake system on a marine vessel, comprising;
   mooring the marine vessel to a docking facility located in a body of water;
   coupling a flexible conduit to the marine vessel in communication with at least two pumps located on the docking facility; and
   transferring water collected from an area below the docking facility to the flexible conduit and to the water intake systems on the marine vessel.

10. The method of claim 9, wherein the area below the docking facility is surrounded by a net, a mesh, or a screen.

11. The method of claim 9, wherein the at least two pumps include an intake device having a filter screen attached thereto.

12. The method of claim 11, wherein the filter screen is configured to include an approach velocity between about 0.1 feet per second (fps) and about 1 fps.

13. The method of claim 11, further comprising:
   providing intermittent flashes of light to the filter screen.

14. The method of claim 11, wherein the flexible conduit is a hose.

15. A pump station adjacent a docking facility in a body of water, comprising:
   a plurality of pump assemblies at least partially disposed in the body of water below the docking facility, each of the pump assemblies comprising;
      an intake device coupled to a pump motor and a casing; and
      a plurality of underwater lighting devices directed to a filter screen coupled to the intake device;
   a controller; and
   a plumbing system coupling each pump assembly together and adapted to couple to a marine vessel moored to the docking facility.

16. The pump station of claim 15, wherein each of the plurality of underwater lighting devices are strobe lights.

17. The pump station of claim 15, wherein docking facility is mounted on at least three pilings and the one or more pump assemblies are positioned inside a perimeter of the pilings.

18. The pump station of claim 17, wherein the at least three pilings include a filter attached thereto surrounding the one or more pump assemblies.

19. The pump station of claim 18, wherein the filter extends to a bottom of the body of water.

20. The pump station of claim 19, wherein at least a portion of the plumbing system includes a flexible portion.

21. The pump station of claim 15, wherein the flexible conduit comprises a hose.

* * * * *